United States Patent
Kautio et al.

(10) Patent No.: US 7,223,022 B2
(45) Date of Patent: May 29, 2007

(54) ALIGNMENT OF AN OPTIC OR ELECTRONIC COMPONENT

(75) Inventors: Kari Kautio, Oulu (FI); Harri Kopola, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/519,270

(22) PCT Filed: Jun. 23, 2003

(86) PCT No.: PCT/FI03/00508

§ 371 (c)(1),
(2), (4) Date: Dec. 22, 2004

(87) PCT Pub. No.: WO04/001475

PCT Pub. Date: Dec. 31, 2003

(65) Prior Publication Data

US 2005/0226565 A1    Oct. 13, 2005

(30) Foreign Application Priority Data

Jun. 24, 2002   (FI)   ................................ 20021225

(51) Int. Cl.
*G02B 6/36*   (2006.01)

(52) U.S. Cl. ............................ 385/76; 385/80; 385/84; 385/88

(58) Field of Classification Search ................... 385/76
See application file for complete search history.

(56) References Cited

U.S. PATENT DOCUMENTS 5,337,398 A * 8/1994 Benzoni et al. ................ 385/90
5,940,564 A   8/1999 Jewell .......................... 385/93
6,217,232 B1  4/2001 Duesman et al. ............. 385/88

FOREIGN PATENT DOCUMENTS

EP    1 061 391 A2   12/2000
EP    1 061 391 A3    3/2002

* cited by examiner

*Primary Examiner*—Frank G. Font
*Assistant Examiner*—Mary El-Shammaa
(74) *Attorney, Agent, or Firm*—Harrington & Smith, PC

(57) ABSTRACT

A method and an arrangement for aligning at least one optic and/or electronic component on a substrate or a corresponding support structure, wherein the method includes: arranging a hole in the support structure; arranging at least three stud bumps on the surface of the component; and arranging said stud bumps along the periphery of the hole for alignment of the component to the hole.

20 Claims, 1 Drawing Sheet

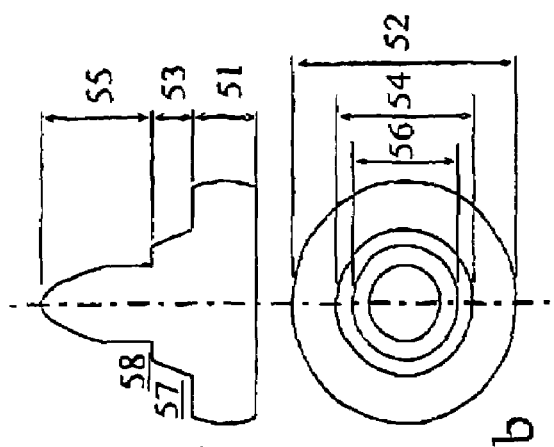
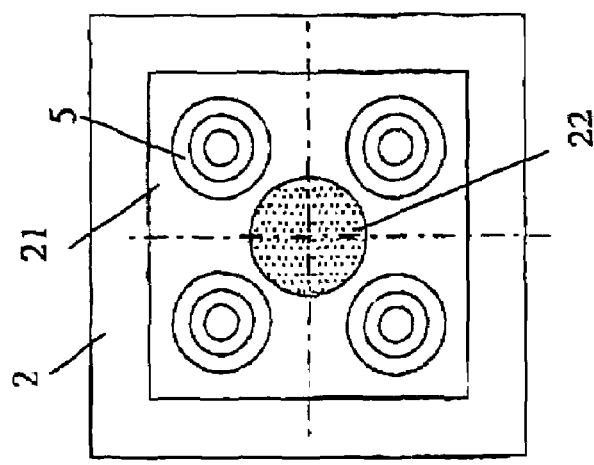
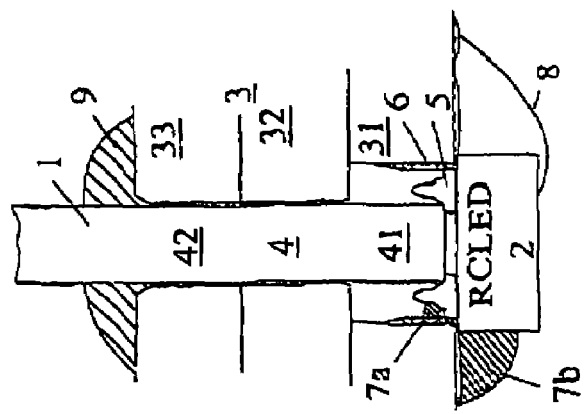

ALIGNMENT OF AN OPTIC OR ELECTRONIC COMPONENT

FIELD OF THE INVENTION

The present invention relates to a method for aligning an optic or electronic component, and especially for aligning an optic fibre and an optoelectronic component mounted on a substrate. The present invention relates also to an arrangement for aligning an optic or electronic component, and especially for aligning an optic fibre and an optoelectronic device mounted on a substrate.

BACKGROUND OF THE INVENTION

In optoelectronic applications transceivers mounted on a substrate, such as a low or high temperature cofired ceramic (LTCC, HTCC) substrate, are used to convert electrical signals to optical signals and vice versa. Optic fibres transmit the optic signals. The fibres have to be aligned precisely with the transceivers in order to make a proper connection between the optic fibre and the transceiver.

U.S. Pat. No. B1 6,217,232 discloses a method and apparatus for coupling an optic fibre to the output of an side emitting optoelectronic device. The optoelectronic device is mounted on a substrate and aligned with the optical axis of the optic fibre by using posts formed on either the substrate or the optoelectronic device and matching recesses formed on the other. Three or more posts and recesses will be formed on the mounting surfaces so as to provide only one possible alignment. The optic fibre is arranged parallel with the substrate plane in a V-shaped channel formed on the substrate and being capable of retaining the optic fibre in a predetermined alignment relative to the device aligned by posts and recesses.

Forming the V-shape groove and the posts and recesses are generally performed by different processes which may cause alignment errors between the V-shape groove and the posts and recesses. Especially when the V-shape groove has a relatively large width and a depth the alignment error increases and the coupling between the optoelectronic device and the optic fiber is poor. Further, prior art alignment methods are relatively labor intensive and costly.

SUMMARY OF THE INVENTION

The object of the present invention is to eliminate the disadvantages of the prior art and to provide a new method for mounting an optic or electronic component on a substrate and especially aligning an optic fibre with the component with improved aligning accuracy. The object of the present invention is also to provide a new arrangement for mounting an optic or electronic component on a substrate and especially aligning an optic fibre with the component with improved aligning accuracy.

In the present invention the component is aligned on a substrate and especially an optical fibre is aligned with the component, for example an optical surface emitting light source chip component, such as RCLED or VCSEL, by using stud bumps made on the chip top metallization. The stud bumps are manufactured with a wire bonding method and act as a mechanical structure, but also as an electrical contact especially to the substrate metallization. In the present invention, the outer surfaces of the stud bumps formed on the component are used to align the component with an opening in the substrate or a corresponding support structure. Additionally the inner surfaces of the stud bumps may be used to align an optic or optoelectronic element to the component. Characteristic features of the present invention are in detail presented in the enclosed claims.

In the present invention, the optic or electronic component and also the optical fibre are aligned mechanically and accurately. Further, aligning can be performed by using same stud bumps for aligning both the component on a substrate and the optical fibre with the component. This allows for low manufacturing cost. Further, the optical fibre becomes almost in contact with the light source, which improves coupling. The multilayer ceramic technology enables the manufacture of light emitter arrays and the integration of the controller electronics on the same module.

BRIEF DESCRIPTION OF THE DRAWINGS

In the following, the invention will be described in more detail with reference to the enclosed drawing, in which FIG. 1 presents passive alignment of an optic fibre with a light source of a RCLED according to the present invention, FIG. 2 presents a RCLED bumping for passive alignment in FIG. 1, FIG. 3a presents a stud bump made with a gold wire, and FIG. 3b presents a top view of a stud bump of FIG. 3a.

DETAILED DESCRIPTION OF THE INVENTION

FIG. 1 presents aligning an optic fibre 1 to a resonant cavity LED chip 2 and the latter on a substrate 3. The LED 2 is mounted on a bottom side of the substrate 3

In the present invention the resonant cavity LED component 2 is aligned on the substrate and the optic fibre 1 is aligned to the LED 2 by using for example four stud bumps 5 made on the chip top metallization 22 (FIG. 2) facing the substrate by using a wire bonder and arranged symmetrically along the periphery of the bottom opening of the hole 4 to provide only one possible alignment. The stud bumps 5 act as a mechanical structure for the LED 2 and fibre 1 alignment, but also as an electrical contact to the substrate metallization.

The substrate consists of three dielectric layers, bottom layer 31, center layer 32 and top layer 33. The thickness of the layers is typically for example 200 μm. The substrate 3 may be either with low temperature or high temperature cofired ceramic (LTCC, HTCC).

The optical fibre 1 is mounted perpendicular to the plane of the substrate 3 through a hole 4 in the substrate 3 and aligned to the LED 2. The hole 42 through tape layers 32 and 33 is slightly bigger in diameter than the fibre diameter. The bottom dielectric layer 31 has a bigger hole 41, and a metallization 6 on the hole walls, to center the chip component 2 using the stud bumps 5.

The stud bumps 5 are formed by using a ball bonding apparatus according to following steps: a) A small ball is formed at the end of the wire, for example Au wire, passing through a bonding tool. b) The bonding tool is caused to press the small ball against the electrode for bonding thereto and forming the stud bump. c) The bonding tool is moved vertically from the surface of the electrode so that the Au wire is cut from the stud bump.

The stud bump 5 consists for example of a broad bottom part 51 with rounded walls 52, a conical middle part 53 with downwards sloping walls 54 and an narrow upper part 55 with rounded end portion 56. There are small horizontal brims 57,58 between the different parts (FIGS. 3a and 3b).

In the assembly, the light source chip 2, equipped with stud bumps 5 with bottom parts against the surface of the chip, is mounted first to the substrate 3 by using the outer parts of surfaces 52 of the bottom parts 51 of the stud bumps for mechanical centering.

The optical fibre 1 is led through the substrate 3 and aligned to the chip 2 provided with metallization 21 on the surface facing the substrate by arranging the fibre between the stud bumps and by using the conical shape of the inner surfaces of stud bumps located symmetrically on four sides of the radiating source 22, as shown in FIG. 2, so that the fibre 1 end finally is supported by the brims 57. The shape of the bumps can be further developed for maximum alignment accuracy by proper bonding tool design and by the optimisation of the bonding parameters.

A conductive adhesive 7a can be used on the stud bump 5 outer surfaces to accomplish an electrical connection to the metallization 6, if necessary. A non-conductive adhesive 7b is used at the chip edges to attach it firmly to the substrate 3. Typically, the other chip electrode is wire bonded with a bond wire 8 to the substrate. Further, the fibre 1 is tightened to the hole 4 with adhesive 9 in the upper opening of the hole 4.

The accuracy of the fibre 1 and chip 2 alignment is dependent on how accurately the bumps 5 are positioned on the chip 3. The stud bump 5 itself is repeatable within a few micrometers. It is, however, necessary to center the chip within +/−15 μm to enable the optical fibre alignment and to avoid excessive bending of the fibre. The stud bump positioning accuracy is typically +/−5 μm using a standard automatic wire bonder. This would mean a maximum misalignment of about 10 μm. With special bonding equipment development, the accuracy could be even better.

It is obvious to the person skilled in the art that different embodiments of the invention are not limited to the example described above, but that they may be varied within the scope of the enclosed claims. The substrate may be of another type than presented above, consisting of at least two different layers. The number of stud bumps is not limited to four. However, there have to be at least three stud bumps arranged symmetrically along the periphery of the bottom opening of the hole to provide only one possible alignment. Further, the optoelectronic component may also be of any other surface emitting component that can be applied in the optoelectronic telecommunication or other systems, but also any other passive or active electronic or optic component that have to be aligned on a substrate. And further, the sud bump may be connected to the substrate without a conductive adhesive for example by using direct bonding methods, such as ultrasonic bonding or thermocompression bonding. It is also possible to use solder stud bumps which can be connected to the substrate with a solder connection.

The invention claimed is:

1. A method for aligning at least one optic and/or electronic component on a substrate or a corresponding support structure, characterised in that the method comprises:
arranging an optic fibre hole in the support structure, wherein a center axis of the optic fibre hole is aligned generally perpendicular to the support structure;
arranging at least three stud bumps on the surface of the component; and
arranging said stud bumps at least partially in the optic fibre hole along the periphery of the hole for alignment of the component to the hole.

2. A method according to claim 1, characterised in that aligning the component is performed by arranging the outer surfaces of the stud bumps against the hole walls.

3. A method for aligning at least one optic fibre and an optoelectronic component to each other according to claim 1, wherein the component is mounted on a supporting structure and the optic fibre is connected to the optoelectronic component, characterised in that the method comprises:
threading the optic fibre through the hole, and
aligning the optic fibre and the component with each other by means of the stud bumps.

4. A method according to claim 1; characterised in that aligning the fibre is performed by arranging the fibre against the inner surfaces of the stud bumps.

5. A method according to claim 1, characterised in that the stud bumps have at least partly a conical and/or rounded surfaces, and that aligning the optic fibre with the component is performed by adapting the optic fibre along sloping conical inner surfaces and a horizontal brim in the stud bumps.

6. A method according to claim 1, characterised in that the component is a surface emitting optoelectronic component, that the optic fibre is arranged perpendicular to the support structure, and that the fibre is connected to a radiating source on a metallized surface of the component facing the substrate.

7. A method according to claim 1, characterised in that a conductive adhesive is used on the stud bump outer surfaces to accomplish an electrical connection to the support structure.

8. A method according to claim 1, characterised in that a direct bonding method is used to connect the stud bumps to the support structure.

9. A method according to claim 1, characterised in that the stud bumps are of a solder material, and that a solder connection is used to connect the stud bumps to the support structure.

10. An arrangement for aligning at least one optic and/or electronic component on a substrate or a corresponding support structure, characterised in that the arrangement comprises:
an optic fibre hole in the support structure, wherein a center axis of the optic fibre hole is aligned generally perpendicular to the support structure;
at least three stud bumps arranged on the surface of the component located at least partially in the optic fibre hole along a periphery of the hole, for aligning the component centered to the hole.

11. A arrangement according to claim 10, characterised in that the stud bumps have at least partly a conical and/or rounded surfaces, and that an optic fibre is aligned with the component by adapting the optic fibre along sloping conical inner surfaces and against a horizontal brim in the stud bumps.

12. An arrangement according to claim 10, characterised in that the component is a surface emitting optoelectronic component, that the optic fibre is arranged perpendicular to the substrate, and that the fibre is connected to a radiating source on a metallized surface of the component facing the substrate.

13. An arrangement according to claim 10, characterised in that a conductive adhesive is used on the stud bump outer surfaces to accomplish an electrical connection to the substrate.

14. An arrangement according to claim 10, characterised in that direct bonding is used to connect the stud bumps to the substrate.

15. An arrangement according to claim 10, characterised in that the stud bumps are of a solder material, and that a solder connection is used to connect the stud bumps to the substrate.

16. An arrangement according to claim 10, characterised in that the substrate consists of at least two layers, and that the diameter of the hole portion(s) in the layer(s) near the component is bigger having place for both the stud bumps and the optic fibre than in other opening portion(s) having a diameter essentially corresponding the diameter of the optic fibre.

17. An arrangement for aligning at least one optic or electronic component on a support structure, the arrangement comprising at least three stud bumps arranged on a surface of the component, wherein the support structure comprises an optic fibre hole adapted to receive an end of an optic fibre, wherein a center axis of the optic fibre hole is aligned generally perpendicular to the support structure, wherein the stud bumps are located, at least partially, in the hole and contact walls of the hole to align the component relative to the hole.

18. An arrangement as in claim 17 wherein the stud bumps have at least partly a conical and/or rounded surface, and that an optic fibre is aligned with the component by adapting the optic fibre along sloping conical inner surfaces and against a horizontal brim in the stud bumps.

19. An arrangement according to claim 17 wherein the component is a surface emitting optoelectronic component, wherein the optic fibre is arranged perpendicular to the support structure, and wherein the optic fibre is connected to a radiating source on a metallized surface of the component facing the support structure.

20. An arrangement according to claim 17 wherein a conductive adhesive is used on outer surfaces of the stud bumps to electrically connect the stud bumps to the support structure.

* * * * *